United States Patent [19]

Müller et al.

[11] Patent Number: 4,960,010

[45] Date of Patent: Oct. 2, 1990

[54] DRIVE AND LOCKING SYSTEM

[75] Inventors: Hans C. Müller, Neckargemünd; Richard Schopp, Heidelberg, both of Fed. Rep. of Germany

[73] Assignee: Teldix GmbH, Heidelberg, Fed. Rep. of Germany

[21] Appl. No.: 359,741

[22] PCT Filed: Dec. 2, 1987

[86] PCT No.: PCT/EP87/00749

§ 371 Date: May 19, 1989

§ 102(e) Date: May 19, 1989

[87] PCT Pub. No.: WO88/04376

PCT Pub. Date: Jun. 16, 1988

[30] Foreign Application Priority Data

Dec. 4, 1986 [DE] Fed. Rep. of Germany ....... 3641463

[51] Int. Cl.$^5$ .................. F16H 35/04; F16D 11/06
[52] U.S. Cl. ......................................... 74/640; 192/71
[58] Field of Search ............... 74/804, 789, 764, 803, 74/805, 640, 650, 661, 664, 745; 192/18 R, 71, 78, 109 R; 475/162, 173, 174, 286, 323, 347

[56] References Cited

U.S. PATENT DOCUMENTS

| | | | |
|---|---|---|---|
| 2,906,143 | 9/1959 | Musser | 74/640 |
| 3,546,966 | 12/1970 | Brooks | 74/640 |
| 4,289,224 | 9/1981 | Dobberpuhl | 74/650 X |
| 4,372,415 | 2/1983 | Watanabe et al. | 74/650 X |
| 4,445,337 | 5/1984 | McCreary | 74/664 X |
| 4,491,210 | 1/1985 | Mason | 192/71 X |
| 4,606,443 | 8/1986 | Kimura | 192/109 R X |
| 4,660,427 | 4/1987 | Fenton | 74/805 X |

FOREIGN PATENT DOCUMENTS

| | | | |
|---|---|---|---|
| 1578892 | 8/1969 | France . | |
| 2315746 | 10/1973 | France . | |
| 304200 | 12/1932 | Italy | 74/650 |
| 27567 | 10/1902 | Switzerland . | |

OTHER PUBLICATIONS

*Harmonic Drive, Principles and Performance,* United Shoe Machinery Corporation, Boston, Mass., 1959, pp. 8-10.

Primary Examiner—Leslie A. Braun
Assistant Examiner—Benjamin Levi
Attorney, Agent, or Firm—Spencer & Frank

[57] ABSTRACT

A drive and locking system enables a rotor (2) to be turned between two end portions which are rotationally displaced in relation to one another through a present angle, and allows the rotor to be locked in an end position. Corresponding to the end positions are end stops (1a, 1b) against which the drive urges the rotor (2). In this position movable levers (12), which are disposed between two parts and fixed to one of them, can be released. The levers (12) are provided with teeth (11) which then engage in recesses in the rotor (2). The still-effective drive moment of the drive system then entrains the part (13), to which the levers (12) are not fixed, in a direction opposite to the rotational direction of the rotor. The levers (12) are then guided from the position in which they link both parts by passing over sloping surfaces, and the levers (12) are then brought into a locking position of the rotor (2) and of the part (14) which is provided with the levers (12).

4 Claims, 2 Drawing Sheets

DRIVE AND LOCKING SYSTEM

BACKGROUND AND SUMMARY OF THE INVENTION

The invention relates to and locking system including a drive shaft connected with a drive, a drive, a gear assembly, and a rotor which can be turned by means of the drive shaft and the gear assembly between two end positions rotated relative to one another by a predetermined angle and which can be locked in at least one of the end positions.

It is the object of the invention to provide a drive and locking system which locks the rotor in at least one end position without a further drive member (e.g. a motor, magnet or the like) having to become effective to accomplish this once the end position is reached.

This is accomplished by a drive and locking system of the above-mentioned type which, with reference to the drawings, is characterized in that the at least one end position is determined by a rigid stop (1a, 1b); the drive shaft (5) is concentric with the rotor (2); at least one intermediate gear arrangement (7, 8, 9) is disposed between the drive wheel (6) of the drive shaft (5) and the rotor drive face (9) which is concentric therewith so as to establish a driving connection; a member (13) connected with the at least one intermediate gear arrangement (7, 8) is disposed concentric with the rotor (2); said member (13) is connected by means of a lever arrangement (12) with a further member (14) connected with the stator in such a manner and said lever arrangement (12) is arranged and configured in such a manner that, if the end position is reached, the lever connection (12) between both members (13 and 14) is releasable and the driving moment acting on the member (13) and the thus produced rotation of the member (13) is released by way of sloped faces (16) and then the released lever arrangement (12) engages at the rotor (2) in the sense of locking it in the end position; and the lock is secured by turning the member (13) relative to the other member (14).

Further improvements will become apparent from the ensuing detailed description.

The gear assembly may be a toothed wheel assembly in which the shaft of any desired drive drives one or a plurality of intermediate gears by way of a toothed wheel, with the axes of the intermediate gears lying on a circle that is concentric with the axis of the drive. The intermediate gear or gears then engage in the internal teeth of a member connected with the rotor. The intermediate gears or, more precisely, their shafts, are fastened to the above-mentioned member.

However, the gear assembly may also be an assembly known by the name of "harmonic drive" which will be described in greater detail with reference to the drawing figures (see, for example, U.S. Pat. No. 2,906,143 and German Auslegeschrift No. 2,315,746).

BRIEF DESCRIPTION OF THE DRAWINGS

One embodiment of the invention will be described in greater detail in connection with a description of the drawing figures.

It is shown in.

DESCRIPTION OF THE PREFERRED EMBODIMENT

Figure 1:
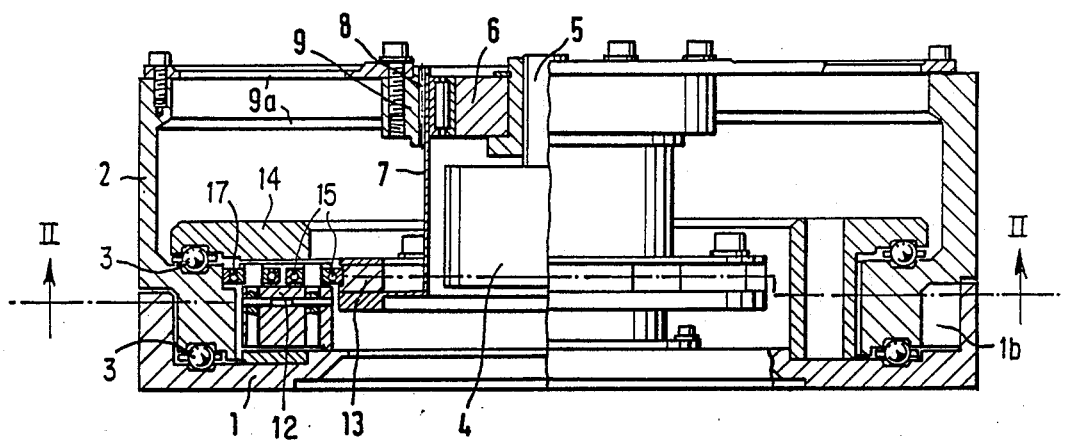
FIGS. 1 and 2 are sectional views taken along section lines I—I and II—II.

In FIG. 1, a stationary member is identified by 1, with a rotatable member 2 (rotor) being supported thereon in bearings 3. Concentric with rotor 2, a motor 4 (which is not shown in FIG. 2) is fastened to stationary member 1 so as to drive rotor 2 by way of a drive shaft 5. Drive shaft 5 drives an elliptically configured member 6 which outwardly deforms a flexible tube 7 at radially opposite locations and thus brings the external teeth 8 on tube 7 into partial engagement with internal teeth of a ring 9. Ring 9 has a number of teeth which is larger by an even number (e.g. 2) than flexible tube 7. Thus, a revolution of shaft 5 causes ring 9 to be turned together with rotor 2, which is connected with it by way of members 9a, about an angle corresponding to the difference between the number of teeth.

Figure 2:
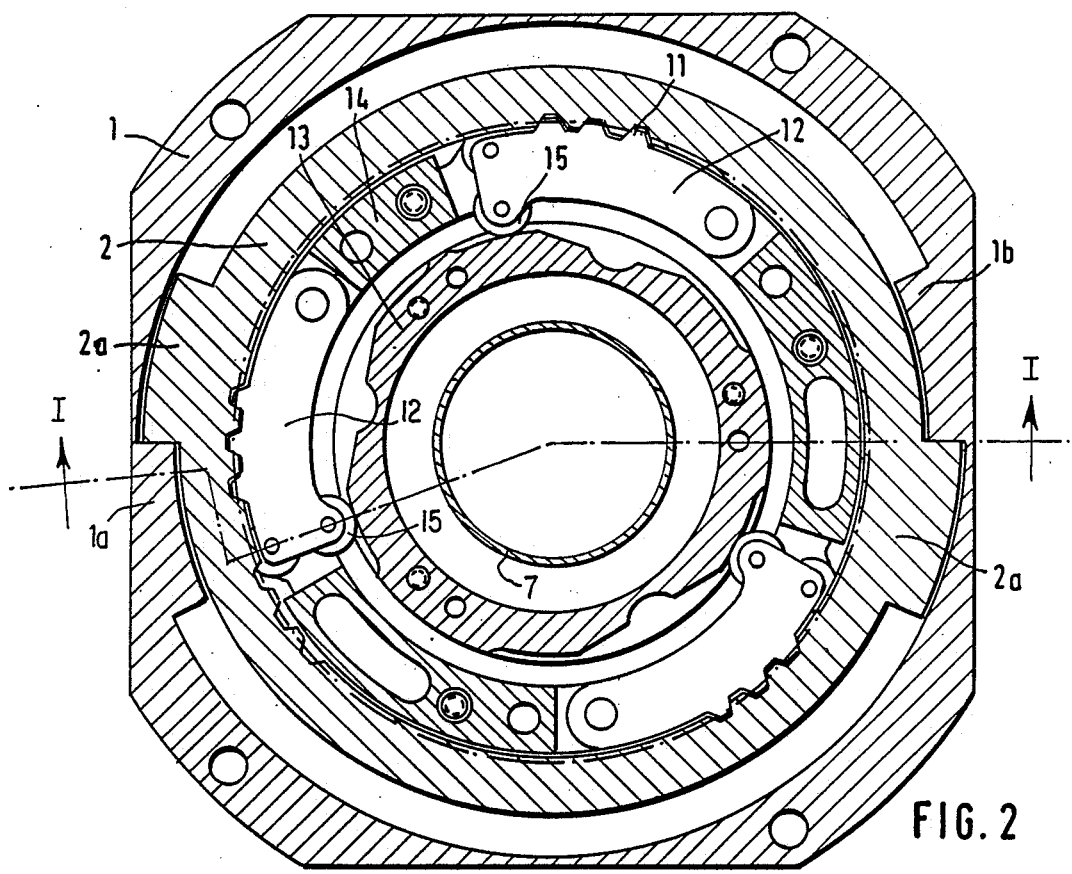

Two stops 1a and 1b are provided at stationary member 1, at which portions 2a of rotor 2 lie in the end positions. This is shown in FIG. 2, in which rotor 2 is shown at one end position. Teeth 11 at locking levers 12 engage in corresponding gaps in rotor 2. Teeth 11 and the gaps are arranged in such a manner that the slopes of the teeth and of the gaps exert a moment on the rotor in the direction of stop 1a, thus pressing the rotor firmly against the stop without play. FIG. 2 shows three locking levers 12 that are fastened to a member 14 which is connected with the stator.

Figure 3:
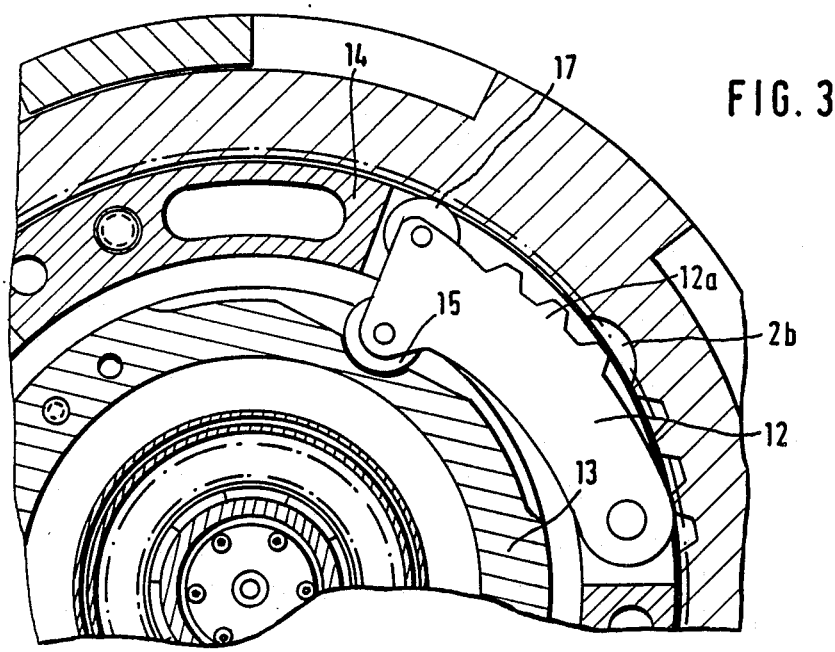
FIGS. 3 and 4 depict portions of FIG. 2 to explain the operation.

If drive shaft 5 is rotated, the rotor is turned until it reaches the stop (e.g. 1a). During this rotation phase of rotor 2, a ring 13 connected with flexible tube 7 is formlockingly blocked by levers 12 and rollers 15 fastened thereto in that roller 15 is disposed in a recess in concentric ring 13. Roller 17 rolls along a concentric path on rotor 2 (FIG. 3). Thus lever 12 is prevented from being deflected. As soon as the stop is reached, a recess 2b interrupts the path of rotor 2 so that now lever 12 can be deflected. Since the stop prevents rotor 2 from moving further, the reaction moment of motor drive 4 turns flexible tube 7 and the now free concentric ring 13 connected therewith in the opposite direction.

Figure 4:
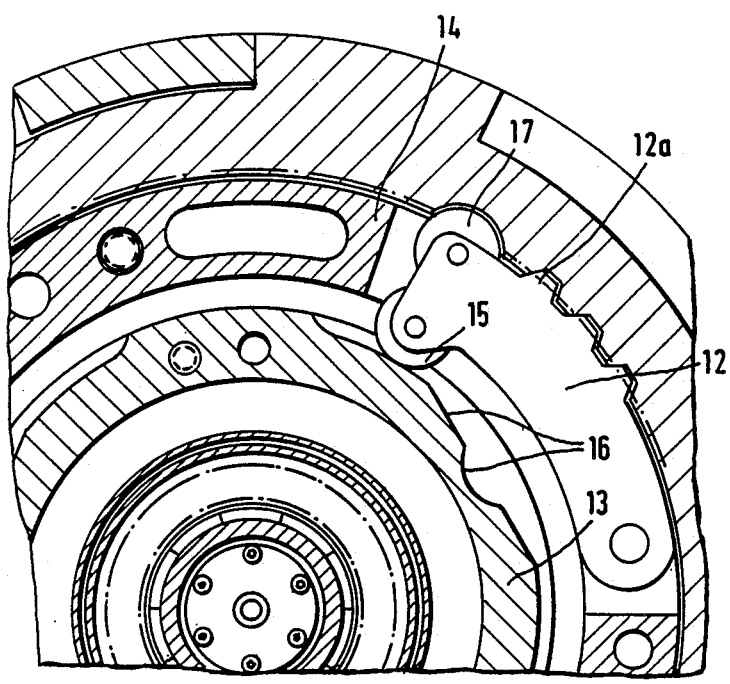

Thus levers 12 are lifted against a spring, which is not shown here, by way of slopes 16 and rollers 15, causing teeth 12a to engage in the now oppositely disposed gaps of rotor 2 and to lock it (see FIG. 4).

Since the slopes subsequently change into faces which are concentric with the center point and member 13 is turned until rollers 15 have reached these faces (position shown in FIG. 2), the lock remains in effect even if no further moment acts on member 13.

Such a drive and locking system may be employed, for example, in space travel, to move an antenna arm into space, in which case it is important to hold the arm in the spacecraft practically rigidly in the operating position.

We claim:

1. A drive and locking system, comprising:
   a stator having a rigid stop portion;
   a rotor which is mounted for rotation, with respect to the stator, between first and second end positions which are rotated relative to one another about a predetermined angle, the first end position being determined by the rigid stop portion of the stator;
   a drive shaft which is concentric with the rotor;
   drive means for rotating the drive shaft;
   transmission means for turning the rotor with respect to the stator when the drive shaft is rotated, the transmission means including a drive wheel on the drive shaft, and gear means disposed between the drive wheel and the rotor for driving the rotor; and locking means for locking the rotor in he first end position, the locking means including

- a first member which is disposed concentric with the drive shaft, the first member being connected to the gear means and being rotatable with respect to the stator, the first member having a sloping face,
- a second member which is connected to the stator, and
- means, including a lever, for connecting the first and second members via the lever until the rotor reaches the first end position, and for thereafter releasing the connection between the first and second members and shifting the lever into engagement with the rotor by way of the sloping face of the first member to lock the rotor in the first end position, the lock being secured by rotation of the first member with respect to the second member.

2. The system of claim 1, wherein one of the lever and the rotor has teeth and the other of the lever and the rotor has gaps to receive the teeth when the lever is shifted into engagement with the rotor, the teeth and gaps being configured so as to exert a torque on the rotor toward the stop portion of the stator.

3. The system of claim 1, wherein the drive wheel of the transmission means is eccentric, and wherein the transmission means comprises a harmonic drive having a flexible member by which the rotor is driven.

4. The system of claim 1, wherein the rotor is configured so as to prevent the lever from being shifted until the rotor reaches the first end position.

* * * * *